Figure 1:
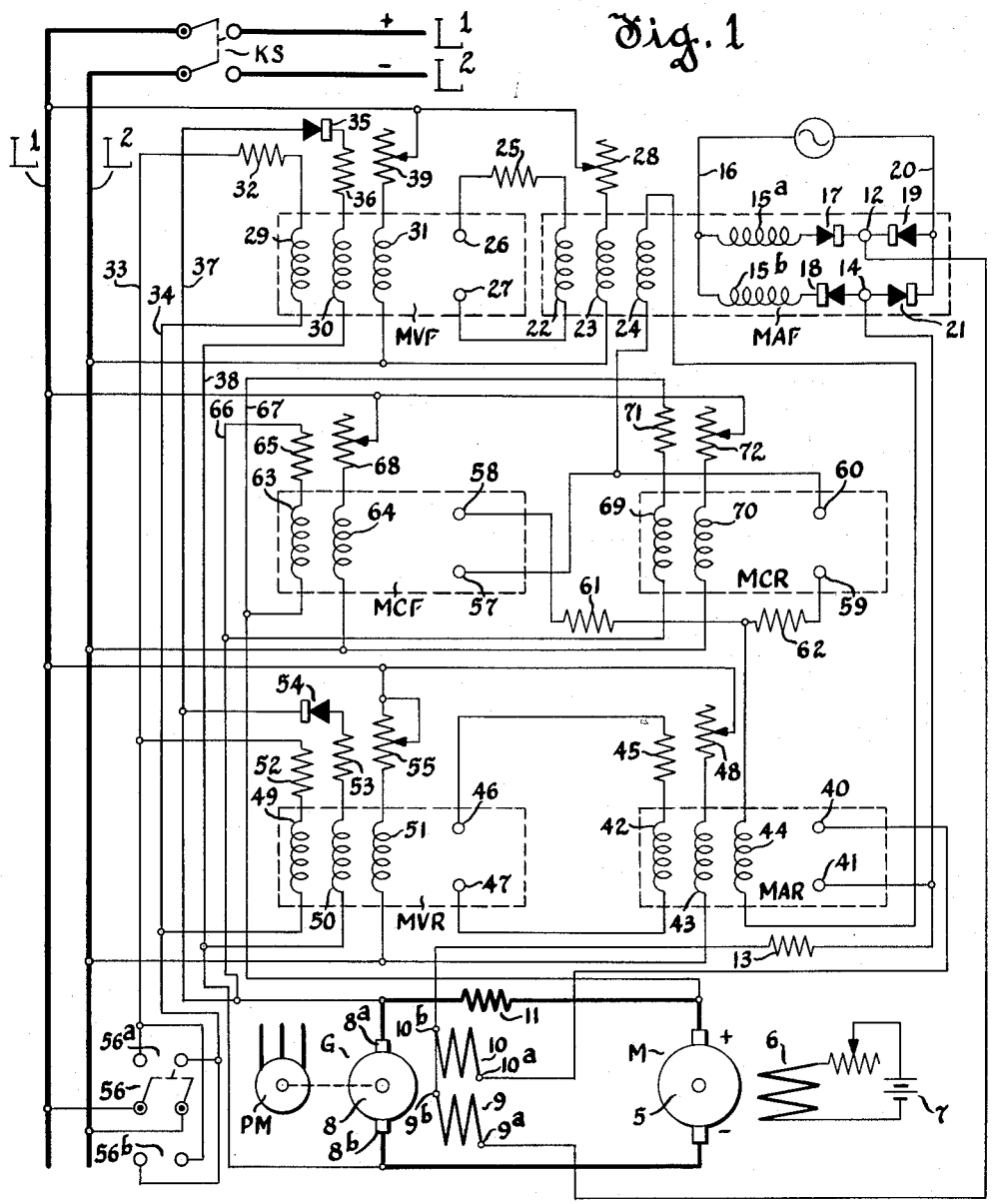

Nov. 1, 1955     P. M. FISCHER ET AL     2,722,653
ADJUSTABLE VOLTAGE DRIVE GENERATOR CONTROL SYSTEM
Filed June 5, 1953

Inventors.
Paul M. Fischer
Eric Pell
By W. C. Lyon
Attorney

United States Patent Office 2,722,653
Patented Nov. 1, 1955

2,722,653

ADJUSTABLE VOLTAGE DRIVE GENERATOR CONTROL SYSTEM

Paul M. Fischer, Milwaukee, and Eric Pell, Shorewood, Wis., assignors to Cutler-Hammer, Inc., Milwaukee, Wis., a corporation of Delaware Application June 5, 1953, Serial No. 359,726

10 Claims. (Cl. 322—25)

This invention relates to a generator control system in an adjustable voltage drive.

While not limited thereto, the control system of the present invention is advantageous for use in reversible adjustable voltage drives where the motors are connected to high inertia loads.

A primary object of the invention is to provide an improved control system of the aforementioned character which is of the closed-loop type, and which affords generator terminal voltage and armature current limit regulation.

Another object is to provide a control system of the aforementioned type which is characterized by fast response, and improved stability.

A further object is to provide in conjunction with such a control system for current limit regulation which is fast acting, but which does not provide a regulating influence until the current magnitude closely approaches predetermined safe limits.

A still further object is to provide a control system of the aforementioned type utilizing control instrumentalities which are of the static type and which are characterized by ruggedness and long life, and Another more specific object is to provide means for appreciably diminishing the magnitude of undesirable induced currents in the controlled field windings of the generator.

Other objects and advantages of the invention will hereinafter appear.

In carrying out the invention, the main generator of an adjustable voltage drive is provided with either two like control field windings, or a single center-tapped control field winding, and each such winding section, is provided with an individualized excitation regulator. Each excitation regulator in turn has associated therewith an individualized generator terminal voltage regulator, and each of the latter is capable of controlling the output of its associated excitation regulator to maintain the generator terminal voltage at a substantially constant preselected value during operation of the system to afford drive of the motor in a respective one of its operating directions. There is also provided a pair of separate current limit regulators, one of which functions upon rise of generator armature current closely approaching a predetermined safe limit, in one direction of generator armature current flow to take over control of both excitation regulators, and the other of which functions in like manner during the other direction of generator armature current flow to take over control of both excitation regulators. The current limit regulators when taking over the control of the excitation regulators function to limit the rise of current in the loop-circuit of the drive to the aforementioned predetermined safe limit. Corresponding output connections of the excitation regulators with corresponding field winding terminals are made through a common impedance element which substantially eliminates induced currents in the field windings of the generator.

The accompanying drawings illustrate a preferred embodiment of the invention which will now be described, it being understood that the embodiment illustrated is susceptible of various modifications without departing from the scope of the appended claims.

Figure 2:
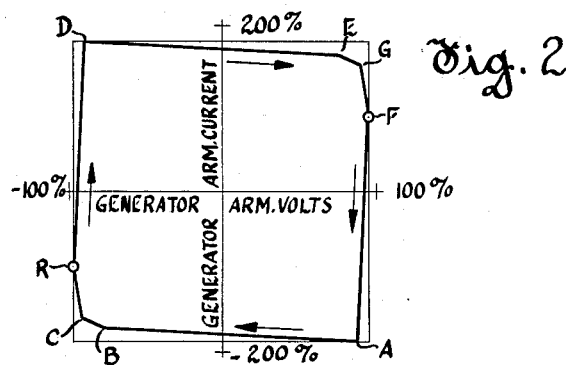

In the drawings:

Figure 1 is a diagrammatic showing of an adjustable voltage drive and a control system therefor incorporating the invention, and Fig. 2 graphically depicts generator voltage and current relationships afforded by the control system of Fig. 1 under certain operating conditions.

Referring to Fig. 1, it shows a motor generally designated M, having an armature 5 and a shunt field winding 6 which may be assumed to be energized from any suitable adjustable voltage source, such as the source 7. Armature 5 of motor M is supplied from armature 8 of a D. C. generator, generally designated G, which also has a pair of shunt field windings 9 and 10. Armature 8 is connected in a loop-circuit with armature 5 of motor M, and a resistor 11 is included in such loop-circuit. It may be assumed that armature 8 is driven at constant speed by any suitable driving motor, such as for example the A. C. induction motor PM.

Field winding 9 is connected at end terminal $9^a$ thereof to output terminal 12 of a self-saturating magnetic amplifier MAF, and is connected at its other end terminal $9^b$ in series with a resistor 13 to the other output terminal 14 of the aforementioned amplifier. Amplifier MAF is provided with output windings $15^a$ and $15^b$ which are connected at corresponding ends to a conductor 16, which may be assumed to have connection to one side of a single phase alternating voltage source. Winding $15^a$ is connected at its other end in series with a rectifier 17 to output terminal 12, and winding $15^b$ is connected at its other end in series with a rectifier 18, which is arranged in the conducting relation shown, to output terminal 14. Output terminal 12 is further connected in series with a rectifier 19, which arranged in the conducting relation shown, to a conductor 20, which may be assumed to be connected to the other side of the aforementioned alternating voltage source, and output terminal 14 is further connected in series with a rectifier 21 to said conductor 20. Amplifier MAF is provided with at least three control windings 22, 23 and 24. Winding 22 is connected in series with a resistor 25 across the output terminals of 26 and 27 of a similar amplifier MVF. Winding 23 is connected in series with an adjustable resistor 28 across the supply lines $L_1$ and $L_2$ of a suitable D. C. voltage source. The connection of winding 24 will hereinafter be described.

Amplifier MVF, although not shown, may be assumed to be provided with output windings, rectifiers, and conductors arranged and connected to a suitable alternating voltage source in the same manner as that aforedescribed in conjunction with amplifier MAF. It is also provided with at least three control windings 29, 30 and 31. Winding 29 is connected in series with a resistor 32 across reference voltage buses 33 and 34. Winding 30 is connected in series with a rectifier 35 and resistor 36 across leads 37 and 38, which have connection with armature terminals $8^a$ and $8^b$ of generator G, respectively. Winding 31 is connected in series with an adjustable resistor 39 across the lines $L_1$ and $L_2$ of the D. C. voltage source.

Field winding 10 of generator G is connected at one end terminal $10^a$ to the output terminal 40 of a magnetic amplifier MAR, and is connected at its other end terminal $10^b$ in series with resistor 13 to the other output terminal 41 of said amplifier MAR. Amplifier MAR may be assumed to be like amplifier MAF and is provided with at least three control windings 42, 43 and 44. Winding 42 is connected in series with a resistor 45 across the output terminals 46 and 47 of a magnetic amplifier MVR, like amplifier MVF. Winding 43 is connected in series with an adjustable resistor 48 across lines $L_1$ and $L_2$ of said D. C. voltage source. The connection of winding 45 will hereinafter be explained.

Amplifier MVR, is provided with at least three control windings 49, 50 and 51. Winding 49 is connected in series with a resistor 52 across the reference voltage buses 33 and 34. Winding 50 is connected in series with a resistor 53 and a rectifier 54 across leads 37 and 38; the arrangement of rectifier 54 in such connection being opposite to that of rectifier 35 in its connection with winding 30 and resistor 36 of amplifier MVF. Winding 51 is connected in series with an adjustable resistor 55 across the lines $L_1$ and $L_2$ of the D. C. voltage source.

Lines $L_1$ and $L_2$ of the D. C. voltage source are connected to a knife switch KS which may be opened to interrupt the supply of voltage thereto. A double pole, double throw knife switch 56 has connection through its blade terminals to lines $L_1$ and $L_2$ and has an upper pair of contacts $56^a$, which when its switch blades are closed thereto connects line $L_1$ to bus 33 and $L_2$ to bus 34 respectively, and has a lower pair of contacts $56^b$, which when its switch blades are closed thereto connect $L_1$ to bus 34 and line $L_2$ to bus 33, respectively. Switch 56 provides for reversing the polarity of voltage to reference buses 33 and 34 and for disconnecting the same from lines $L_1$ and $L_2$.

It will be apparent that as thus far described, change in output of amplifier MAF is dependent upon change in the ampere turn level of its control winding 23 which is directly a function of change in output of amplifier MVF. Winding 23 of amplifier MAF constitutes a "bias" winding and resistance 28 is preferably adjusted to provide a certain minimum voltage output at terminals 12 and 14 even though the ampere turn level of winding 22 be zero.

The winding 31 of amplifier MVF constitutes a "bias" winding and it may likewise be assumed that its associated resistor 39 is adjusted so that there will be a certain minimum voltage output at its terminal 26 and 27 even though the ampere turn levels of windings 29 and 30 be zero. With switch 56 closed to its upper contacts $56^a$, it may be assumed that the relative polarities of buses 33 and 34 are such that the voltage impressed across winding 29 will afford an ampere turn level of such a sense as to saturate amplifier MVF, or turn it "full-on," and provide a certain excess of ampere turns which first must be counteracted before any turn-off of such amplifier can occur. With the polarities of buses 33 and 34 reversed from that just mentioned, as may be effected by closing switch 56 to its lower contacts $56^b$, the direction of the ampere level of winding 29 will be in the "turn-off" sense.

It will be appreciated that through the medium of conductors 37 and 38, winding 30, which constitutes a "signal" winding, is subjected to the terminal voltage at the armature terminals $8^a$ and $8^b$ of generator G. When the polarity of terminal $8^a$ is positive with respect to terminal $8^b$, the current in the generator-motor loop-circuit will flow in the clockwise direction, and it may be assumed that such provides operation of motor M in the "forward" direction. With such relation of polarities at terminals $8^a$ and $8^b$ it may be assumed that the relation of polarities across winding 30 is such as to provide ampere turns in the latter which counter-act or oppose the ampere turns provided by winding 29. As aforementioned the ampere turn level of winding 29 is such as to provide a certain excess beyond that necessary to turn amplifier MVF "full-on," so the generator terminal voltage will consequently have to build up to a certain magnitude before the ampere turn level of winding 30 will counteract such excess, and further increase a magnitude of the generator terminal voltage will thereafter, by increasing the ampere turn level of winding 30 cause magnetic amplifier MVF to progressively turn-off. As amplifier MVF turns-off, the ampere turn level of control winding 22 of amplifier MAF decreases thereby effecting decrease in the excitation voltage across field winding 9. It will be apparent the reverse action will occur on decrease in generator terminal voltage.

With switch 56 closed to its contacts $56^a$, the polarity of reference voltage across winding 49 will be in such direction as to cause amplifier MVR to be turned "full-off," and consequently the ampere turn level of winding 42 of amplifier MAR will be zero. Thus the output voltage of amplifier MAR would be at the minimum value as determined by the ampere turn level of its "bias" winding 43. When the motor M is operating in the "forward" direction, the polarity of generator terminal voltage would be such that no current would flow through winding 50 of amplifier MVR, because of rectifier 54, and amplifier MVR would be maintained "full-off" and thus amplifier MAR would tend to be maintained at its minimum output.

If switch 56 is closed to its lower contacts $56^b$, it is apparent that the polarities of buses 33 and 34 will be those of bus $L_2$ and $L_1$, respectively, of the D. C. voltage source, and consequently the direction of ampere turns levels in windings 29 and 49 of amplifiers MVF and MVR, respectively, will be such as to turn amplifier MVF "full-off" and amplifier MVR "full-on." Thus field winding 10 would be afforded maximum excitation and field winding 9 minimum excitation. Consequently the polarities at terminal $8^a$ and $8^b$ would be in such relation as to cause current flow through armature 5 of motor M in the counterclockwise direction, which may be assumed to afford operation of motor M in the "reverse" direction. As the generator terminal voltage increases the ampere turn level in winding 50 would increase and after rising high enough to counteract the excess ampere turn level of winding 49 would then turn amplifier MAR off with consequent reduction in the excitation of field winding 10. Amplifier MVF would of course remain "full-off" and amplifier MAF would only afford minimum excitation of field winding 9 as determined by the ampere turn level of its "bias" winding 23.

It will be apparent to those skilled in the art that amplifiers MVF and MVR each constitute a voltage regulator, the former of which functions during "forward" operation of motor M to maintain a substantially constant terminal voltage of generator G, and the latter of which functions during "reverse" operation of motor M to maintain a substantially constant terminal voltage of the generator G. Neglecting the influence of control windings 24 and 44 of amplifiers MAF and MAR, which will hereinafter be described, the latter amplifiers would follow the dictates of amplifier MVF and MVR respectively.

The control system further comprises the magnetic amplifiers MCF and MCR. Each thereof may be assumed to be provided with output windings, rectifiers, conductors and connections of the same with the aforementioned alternating voltage source as aforedescribed in connection with amplifier MAF. Amplifier MCF is provided with output terminals 57 and 58, and amplifier MCR is provided with output terminals 59 and 60. Terminals 57 and 60 are each connected to one end of control winding 24 of amplifier MAF, which winding is connected at its other end to a corresponding end of control winding 44 of amplifier MAR. Winding 44 is connected at its other end in series with a resistor 61 to output terminal 58 of amplifier MCF, and is also connected in series with a resistor 62 to output terminal 59 of amplifier MCR.

Amplifier MCF is provided with at least two control windings 63 and 64. Control winding 63 is connected in series with a resistor 65 across a pair of conductors 66 and 67, conductor 66 having connection to the point common between terminal $8^a$ of generator G and resistor 11 and conductor 67 having connection to the point common between resistor 11 and armature 5 of motor M. Winding 64 is connected in series with an adjustable resistor 68 across lines $L_1$ and $L_2$ of the D. C. voltage source. It may be assumed that the polarity of voltage across winding 64 is such, and resistor 68 so adjusted that the ampere turn level of winding 64 is of such magnitude and sense as to turn amplifier MCF "full-off" and provide a certain excess of ampere turns which must be overcome before such amplifier can be turned on. By virtue of the connections of winding 63 through conductors 66 and 67 to points in the generator-motor loop-circuit on opposite sides of the voltage-drop resistor 11, such winding will be subjected to a voltage proportional to the magnitude of current flowing in such loop-circuit, and may be assumed that with current flow in the loop-circuit in the clockwise direction that the polarity of such voltage across winding 63 is such as to provide ampere turns in the latter which counteract the ampere turns of winding 64. If such ampere turn level builds up high enough, corresponding to close approach to a certain current magnitude, in the generator-motor loop-circuit, it may be assumed to completely overcome the aforementioned excess ampere turn level of winding 64, and thereafter act to turn on amplifier MCF increasingly as its ampere turn level increases therebeyond. As amplifier MCF turns on the voltage across winding 24 of amplifier MAF is in such direction as to provide ampere turns which act to turn off amplifier MAF, and the voltage across winding 44 of amplifier MAR is in such direction as to provide ampere turns which act to turn on amplifier MAR.

Amplifier MCR is provided with at least two control windings 69 and 70. Control winding 69 is connected in series with a resistor 71 across conductors 66 and 67, but in opposite relation to the connection of winding 63 and resistor 65 of amplifier MCF. Winding 70 is connected in series with an adjustable resistor 72 across lines $L_1$ and $L_2$ of said D. C. voltage source. Winding 70 acts similarly to winding 64 of amplifier MCF to hold amplifier MCR "full-off." With current flowing in the generator-motor loop-circuit in the clockwise direction the ampere turns provided by winding 69 will aid the ampere turns of winding 70 to keep amplifier MCR turned "full-off." On the other hand, if the current flow in the generator-motor loop-circuit is in the counterclockwise direction, corresponding to operation of motor M in its "reverse" direction, the ampere turns provided by winding 69 will counteract the ampere turns of winding 70, and when the level of the former rises high enough, amplifier MCR will be turned on to provide an output voltage at its terminals 59 and 60. Such output voltage of amplifier MCR will be of such polarity across control windings 44 and 24 of amplifiers MAR and MAF, respectively, that the former will be turned off and the latter turned on. During such action of amplifier MCR amplifier MCF will be held turned off because the ampere turns of its winding 63 will then aid the ampere turns of its winding 64.

Amplifiers MCF and MCR constitute current limit controllers which function during clockwise and counterclockwise current flow in the generator-motor loop-circuit, respectively, to take over control of amplifiers MAF and MAR, when the current in the generator-armature loop-circuit approaches a predetermined safe limit, and thereby control the energization of field windings 9 and 10 so that the generator terminal voltage does not exceed values which will cause the magnitude of current in the generator-motor loop-circuit to exceed such predetermined safe limit. Because of the aforementioned excess ampere turns provided in control windings 64 and 70, amplifiers MCF and MCR only function to take over control of amplifiers MAF and MAR when such predetermined safe limit is closely approached.

The operation of the system in its entirety under various operating conditions will now be described.

Preparatory to operation of the system, motor PM would be brought up-to-speed to rotate the armature 8 of generator at its rated speed. Then switch KS would be closed to energize lines $L_1$ and $L_2$ with consequent energization of "bias" windings 31, 23, 55 and 43 of amplifiers MVF, MAF, MVR and MAR, respectively. Accordingly, field windings 9 and 10 would be energized to the same minimum ampere turn levels, and consequently the net generator flux would be zero, and the generator terminal voltage would thus be zero.

If it is desired to accelerate motor M from rest to its steady state speed in the "forward" direction, switch 56 would then be operated to close its contacts 56$^a$, thereby connecting reference voltage buses 33 and 34 to lines $L_1$ and $L_2$ respectively. Consequently amplifier MVF would be turned "full-on." As a result amplifier MAF would tend to be turned "full-on" to energize field winding 9 to maximum extent, while the output of amplifier MAR would be held at minimum value to afford energization of field winding 10 at its minimum level. Energization of field winding 9 to maximum degree would build up field flux with consequent build-up of generator terminal voltage to cause flow of current in the loop-circuit in the clockwise direction. Because of nil C. E. M. F. of armature 5 of motor M at standstill, and inertia of the armature and load driven thereby, the magnitude of current in the loop-circuit would rapidly build up to the predetermined safe limit. As such predetermined safe limit is closely approached, amplifier MCF will be turned-on to take over control of amplifiers MAF and MAR to turn MAF off and turn MAR on. This results in decrease in excitation of field winding 9 and increase in excitation of field winding 10, with the result that the rise in generator terminal voltage is held down so as to prevent the loop-circuit current from exceeding the predetermined safe limit. Thus motor M and its load will be accelerated at a controlled rate. As the speed of motor M increases its C. E. M. F. increases which effects decrease in the magnitude of current in the loop-circuit, and when such C. E. M. F. builds up sufficiently amplifier MCF is caused to turn-off and amplifier MAF will then be back under the control of amplifier MVF, and the latter will then function to regulate field winding 9 to maintain a predetermined generator terminal voltage as motor M approaches its steady state speed in the "forward" direction.

If it is desired to accelerate motor M from rest to its steady state speed in the "reverse" direction, switch 56 would then be operated to close its contacts 56$^b$, thereby connecting reference voltage buses 33 and 34 to lines $L_2$ and $L_1$, respectively. Consequently amplifier MVR would be turned "full-on" and amplifier MVF would be turned "full-off." As a result amplifier MAR would tend to be turned "full-on" to energize field winding 10 to a maximum degree. However, during acceleration of motor M, amplifier MCR would be turned-on and take over control of amplifiers MAR and MAF to hold the current in the generator-motor loop-circuit to a predetermined safe limit until the C. E. M. F. of armature 5 of motor M builds up sufficiently, as aforedescribed in going from rest to steady state "forward."

Let it be assumed that motor M is operating at its steady state speed in the "forward" direction and that there is a transient increase in load thereon. Motor M will momentarily slow down and draw increased current, thus causing a decrease in generator terminal voltage. As a result, the ampere turn level of winding 30 of amplifier MVF decreases a corresponding amount and the excitation of field winding 9 increases to effect an increase in the generator terminal voltage. If the increase in load is great, the C. E. M. F. of motor M may fall sufficiently so that amplifier MCF is turned on to take over control of amplifier MAF and limit the rate of rise of generator terminal voltage. It will be apparent that the system will act in the reverse manner upon transient decreases in load, but amplifier MCF will not be turned on in such event.

When motor M is operating at its steady state speed in the "reverse" direction amplifiers MVR, MAR and MCR will function similarly to that just described in conjunction with amplifier MVF, MAF and MCF upon transient changes in load being imposed on motor M.

Now let it be assumed that motor M is operating at its steady state speed in the "forward" direction, which condition is depicted by the point F on the generator terminal voltage vs. generator armature current curve of Fig. 2, and that it is desired to quickly go to the steady state of motor M in the "reverse" direction. This may be done by operating switch 56 to open its contacts 56a and immediately closing the same to its contacts 56b. With such change in operating position of switch 56 it will be apparent that amplifier MVR will be turned "full-on" and amplifier MVF will be turned "full-off." Consequently, amplifier MAR tends to be turned "full-on" to energize field winding 10 to maximum extent, and amplifier MAF tends to be turned-off to provide minimum excitation of field winding 9. With such sudden reversal in the excitation of field windings 9 and 10, the generator terminal voltage starts to decrease toward zero, and because of the inertia of armature 5 of motor M and its load then being driven in the forward direction, the C. E. M. F. of armature 5 soon exceeds the generator terminal voltage and the current in the generator-motor loop-circuit quickly changes its direction of flow to the counterclockwise direction with attendant rapid increase in magnitude thereof. The change in generator terminal voltage and armature current during such period is depicted by the portion of the curve of Fig. 2 between the points F and A, and between such points amplifiers MAF and MAR will be under the control of amplifiers MVF and MVR, respectively.

As the magnitude of current in the loop-circuit approaches the predetermined safe limit, which may be assumed, by way of example in conjunction with Fig. 2, to be chosen as 200% of steady state rated load armature current, the ampere turn level of winding 69 of amplifier MCR overcomes the counteracting ampere turns of winding 70 and the latter amplifier MCR is turned-on to take over control of amplifiers MAF and MAR. Consequently, the excitation of field winding 10 is decreased and that of field winding 9 increased sufficiently to limit the magnitude and polarity of the generator terminal voltage, so that the generator-motor loop-circuit current is prevented from exceeding said safe limit. The period during which amplifier MCR controls amplifiers MAF and MAR is depicted by the portion of the curve of Fig. 2 between the points A and B, and it will be noted that during such interval that the generator terminal voltage decreases then reverses in polarity, and thereafter increases in magnitude in the reversed polarity sense.

As the generator terminal voltage closely approaches the magnitude depicted by the point B, the ampere turn level of winding 50 of amplifier MVR rises and that of winding 69 of amplifier MCR decreases to such extent that when point B is reached, amplifier MAR is under the joint control of amplifiers MVR and MCR, and such joint control continues for the portion of the curve between the points B and C. When the point C is reached the ampere turn level of winding 69 decreases to such extent that amplifier MCR is turned off.

As the generator terminal voltage continues to increase, the ampere turn level of winding 50 increases and the excitation of field winding 10 is thus decreased to decrease the current in the generator-motor loop-circuit according to the portion of the curve of Fig. 2 between points C and R. The point R depicts the steady state rated load generator terminal voltage and armature current values in the "reverse" direction of motor operation.

From the foregoing it will be apparent, that in making a quick transition from steady state "reverse" to steady state "forward" operation of motor M, that the relationship of generator voltage and armature current values will be according to the portion of the curve of Fig. 2 including the points R, D, E, G and F. It will also be apparent that during the portion of the curve between points D and E that amplifier MCF will function to control amplifiers MAF and MAR, and that over the portion of the curve between points E and G amplifier MAF will be under the joint control of amplifiers MVF and MCF.

Separation of the current limit regulator amplifiers MCF and MCR from the voltage regulator amplifiers MVF and MVR eliminates the time constants of the latter from the regulating loops of the former, thereby improving the speed of response of current limit action and hence increasing the stability of the system. Such separation also makes for greater flexibility in design of voltage and current limit regulating values.

While the generator field windings 9 and 10 are shown as comprising two separate sections, it will be apparent that such can be combined in a single center-tapped winding.

The use of the common impedance such as resistor 13, in the connections to field windings 9 and 10, as hereinbefore shown and described, has proven to be advantageous in minimizing the magnitude of induced currents which would otherwise flow in either thereof when one is afforded minimum excitation and the other is excited at higher levels, which, as before indicated, occurs under certain operating conditions. Under such conditions of excitation of the field windings, the voltage across the higher level excited winding induces a voltage in the minimum excited winding, and such induced voltage causes current to flow through the rectifiers of the excitation amplifier of the minimum excited winding and through the latter. The magnitude of such induced current flow without the use of a common impedance, such as resistor 13, can amount to more than 30% the magnitude of the current in the higher level excited winding, but with such impedance the value of such induced current is reduced to no more than 2% of the magnitude of current in the higher level excited winding. Such impedance element can be inductive in character if so desired. For optimum results the ohmic value of a resistance type impedance should be equal to that of a field winding, and if an inductive impedance is used the inductance value should be equal to that of a field winding circuit.

We claim:

1. A voltage and current limit control system for the generator in an adjustable voltage drive comprising an excitation regulator having its output connectable in circuit with a field winding of said generator, a regulator having its output in circuit with said excitation regulator and being subjectable to the terminal voltage of such generator to control the output of said excitation regulator in accordance with the magnitude of such voltage, and a current limit regulator having its output in circuit with said excitation regulator and being subjectable to the influence of current in the loop-circuit of such drive to afford preponderance of the controlling effect of the voltage responsive regulator and to control the output of said excitation regulator when the magnitude of such current approaches a predetermined limit.

2. A voltage and current limit control system for the generator in an adjustable voltage drive comprising an amplifier having its output connectable in circuit with a field winding of said generator, a second amplifier having its output in circuit with the first mentioned amplifier and being subjectable to the terminal voltage of such generator to control the output of said first mentioned amplifier in accordance with the magnitude of such voltage, and a third amplifier in circuit with said first mentioned amplifier and being subjectable to the influence of current in the drive loop-circuit to afford preponderance of the controlling effect of said second amplifier and to control the output of said first mentioned amplifier whenever the magnitude of such current approaches a predetermined limit.

3. A voltage and current limit control system for the generator in an adjustable voltage drive comprising a magnetic amplifier provided with a plurality of control windings and having its output connectable to a field winding of said generator, a second magnetic amplifier having its output connected in circuit with a control winding of the first mentioned amplifier and having a control winding subjectable to the influence of generator terminal voltage to control the output of said first mentioned amplifier in accordance with the magnitude of such voltage, and a third magnetic amplifier having its output connected in circuit with another control winding of said first mentioned amplifier and having a control winding subjectable to the influence of the current in the drive loop-circuit to preponderate the controlling effect of said second amplifier and to control the output of said first mentioned amplifier whenever the magnitude of such current approaches a predetermined limit.

4. In an adjustable voltage drive, the combination with a loop-circuit supply generator having a pair of field winding sections energizable to control the magnitude and direction of the generator terminal voltage, of a pair of like excitation regulators, each of which has its output individualized to a respective one of said winding sections, for excitation of said windings in opposed relation, a pair of like terminal voltage regulators, each of which has its output individualized to a respective one of said excitation regulators for controlling the latter in accordance with the magnitude and polarity of the generator terminal voltage, and current limit regulating means responsive to direction and magnitude of current flow in the loop-circuit to preponderate the controlling effect of either of said voltage regulators and control both of said excitation regulators in opposed relation when the magnitude of said current approaches a predetermined limit.

5. In an adjustable voltage drive, the combination with a loop-circuit supply generator having a pair of field winding sections energizable to control the magnitude and direction of the generator terminal voltage, of a pair of like excitation regulators, each of which has its output individualized to a respective one of said winding sections, for excitation of said windings in opposed relaton, a pair of like terminal voltage regulators, each of which has its output individualized to a respective one of said excitation regulators for controlling the latter in accordance with the magnitude and polarity of the generator terminal voltage, and a pair of like current limit regulators, each of which is responsive in the loop-circuit to preponderate the controlling effect of either of said voltage responsive regulators and control the outputs of both of said excitation regulators when the magnitude of said current approaches a predetermined limit.

6. In an adjustable voltage drive, the combination with a main loop-circuit supply generator having a pair of field winding sections energizable to control the magnitude and direction of the generator terminal voltage, of a pair of amplifiers, each of which has its output individualized to a respective one of said field winding sections, for excitation of said winding sections in opposed relation, a second pair of amplifiers each of which has its output individualized to a respective one of the first mentioned amplifiers for controlling the same in accordance with the magnitude and polarity of the generator terminal voltage, and a pair of current limit amplifiers, each of which is responsive to a respective direction of current flow in the loop-circuit to preponderate the controlling effect of either of said voltage responsive amplifiers and control the output of both of said first mentioned amplifiers when the magnitude of said current approaches a predetermined limit.

7. In ad adjustable voltage drive, the combination with a main loop-circuit supply generator having a pair of field winding sections energizable to control the magnitude and direction of the generator terminal voltage, of a pair of magnetic amplifiers each of which is provided with a plurality of control windings and has its output individualized to a respective one of said field winding sections, said amplifiers affording energization of their respective associated field winding sections in opposed relation, a second pair of magnetic amplifiers, each of which has a control winding responsive to generator terminal voltage and its output individualized to a control winding of a respective one of the first mentioned amplifiers for controlling the output of the latter in accordance with the magnitude and polarity of generator terminal voltage, and a third pair of magnetic amplifiers which have their outputs interconnected in circuit with another control winding of each of said first mentioned amplifiers, each of said third pair of amplifiers having a control winding responsive to a respective direction of current flow in the loop-circuit to preponderate the controlling effect of either of said second pair of amplifiers and control the output of said first mentioned pair of amplifiers in opposed relation when the magnitude of said current approaches a predetermined limit.

8. The combination with a D. C. generator having a pair of like field winding sections, of a pair of controllable excitation devices, each of which has a corresponding output terminal connected to a like end of a respective field winding section, and an impedance element connected at one end to each of other like ends of said field winding sections and at its other end to the other corresponding output terminals of said excitation devices for minimization of induced currents in said field winding sections.

9. The combination according to claim 8 wherein said excitation devices are magnetic amplifiers providing rectified A. C. outputs.

10. The combination according to claim 9 wherein said impedance element is a resistance element.

References Cited in the file of this patent

UNITED STATES PATENTS 2,626,376    Harder et al. _____ Jan. 20, 1953